United States Patent
Korman et al.

(10) Patent No.: US 8,595,996 B2
(45) Date of Patent: Dec. 3, 2013

(54) PHOTOVOLTAIC FRAMED MODULE ARRAY MOUNT UTILIZING ASYMMETRIC RAIL

(75) Inventors: Charles Steven Korman, Niskayuna, NY (US); Neil Anthony Johnson, Schenectady, NY (US); Jian Mi, Niskayuna, NY (US); Donald Michael Doherty, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 749 days.

(21) Appl. No.: 12/713,894

(22) Filed: Feb. 26, 2010

(65) Prior Publication Data

US 2011/0209745 A1 Sep. 1, 2011

(51) Int. Cl.
*F24J 2/52* (2006.01)
*H01L 31/042* (2006.01)
*H01L 31/048* (2006.01)

(52) U.S. Cl.
USPC ........... 52/173.3; 126/623; 136/251; 248/237

(58) Field of Classification Search
USPC ............ 52/173.1, 173.3, 656.1, 656.2, 656.5, 52/656.9; 126/621, 622, 623; 136/244, 136/251; 248/237
See application file for complete search history.

(56) References Cited

U.S. PATENT DOCUMENTS

| | | | |
|---|---|---|---|
| 4,266,387 A * | 5/1981 | Karlsson | 52/656.1 |
| 4,284,070 A * | 8/1981 | Wilke | 126/710 |
| 4,336,413 A * | 6/1982 | Tourneux | 136/251 |
| 4,372,292 A * | 2/1983 | Ort | 126/622 |
| D270,660 S * | 9/1983 | Ort | D13/102 |
| D359,138 S * | 6/1995 | Hosseini | D25/125 |
| 5,460,660 A * | 10/1995 | Albright et al. | 136/251 |
| 5,571,338 A * | 11/1996 | Kadonome et al. | 136/251 |
| 5,787,653 A * | 8/1998 | Sakai et al. | 52/173.3 |
| 6,125,606 A * | 10/2000 | Larsson | 52/836 |
| 6,465,724 B1 | 10/2002 | Garvison et al. | |
| 6,622,441 B2 * | 9/2003 | Miller | 52/204.1 |
| 6,672,018 B2 | 1/2004 | Shingleton | |
| 6,784,360 B2 * | 8/2004 | Nakajima et al. | 136/251 |
| D496,249 S | 9/2004 | Liebendorfer | |
| 6,959,517 B2 * | 11/2005 | Poddany et al. | 52/173.3 |

(Continued)

FOREIGN PATENT DOCUMENTS

DE 102007018212 A1 * 10/2008
EP 2362429 A2 * 8/2011

OTHER PUBLICATIONS

SnapRack Mounting System; Available at Solar Taos 2010 Product Catalog; AEE Solar SnapRack Mounting System URL : http://solar-catalog.com/pv_mounts_snaprack.html; 4 Pages.

(Continued)

*Primary Examiner* — Basil Katcheves
*Assistant Examiner* — Rodney Mintz
(74) *Attorney, Agent, or Firm* — Ann M. Agosti

(57) ABSTRACT

A photovoltaic framed module array apparatus for mounting a first framed photovoltaic (PV) module and a second framed PV module is provided. The photovoltaic framed module array apparatus comprises a first rail. The first rail includes an insert slot for accommodating an insert edge of the first framed PV module, and a capture slot for accommodating a capture edge of the second framed PV module. The capture slot is positioned substantively parallel to the insert slot.

15 Claims, 9 Drawing Sheets

(56) References Cited

U.S. PATENT DOCUMENTS

| | | | |
|---|---|---|---|
| 7,260,918 B2 | 8/2007 | Liebendorfer | |
| 7,406,800 B2 | 8/2008 | Cinnamon et al. | |
| 7,592,537 B1* | 9/2009 | West | 136/251 |
| 7,600,349 B2* | 10/2009 | Liebendorfer | 52/173.3 |
| 7,780,472 B2* | 8/2010 | Lenox | 439/567 |
| 7,814,899 B1* | 10/2010 | Port | 126/623 |
| 7,856,769 B2* | 12/2010 | Plaisted et al. | 52/173.3 |
| 7,866,099 B2* | 1/2011 | Komamine et al. | 52/173.3 |
| 7,900,407 B2* | 3/2011 | Plaisted | 52/173.3 |
| 7,915,519 B2* | 3/2011 | Kobayashi | 136/251 |
| 7,956,279 B2* | 6/2011 | Morita et al. | 136/251 |
| 7,956,280 B2* | 6/2011 | Kobayashi | 136/251 |
| 8,039,733 B2* | 10/2011 | Kobayashi | 136/251 |
| 8,104,239 B2* | 1/2012 | Fath | 52/173.3 |
| 8,109,048 B2* | 2/2012 | West et al. | 52/173.3 |
| 8,128,044 B2* | 3/2012 | Liebendorfer | 248/237 |
| 8,176,693 B2* | 5/2012 | Abbott et al. | 52/173.3 |
| 8,256,170 B2* | 9/2012 | Plaisted et al. | 52/173.3 |
| 8,273,981 B2* | 9/2012 | Kobayashi | 136/251 |
| D673,904 S* | 1/2013 | Kobayashi | D13/102 |
| 8,344,239 B2* | 1/2013 | Plaisted | 136/251 |
| 8,443,558 B2* | 5/2013 | Buller et al. | 52/173.3 |
| 8,455,752 B2* | 6/2013 | Korman et al. | 136/251 |
| 8,464,496 B2* | 6/2013 | Cusson et al. | 52/745.06 |
| 2003/0005651 A1* | 1/2003 | Miller | 52/204.1 |
| 2003/0201009 A1* | 10/2003 | Nakajima et al. | 136/251 |
| 2004/0163338 A1* | 8/2004 | Liebendorfer | 52/173.1 |
| 2005/0257453 A1* | 11/2005 | Cinnamon | 52/173.3 |
| 2006/0118163 A1* | 6/2006 | Plaisted et al. | 136/251 |
| 2007/0251567 A1* | 11/2007 | Plaisted | 136/244 |
| 2008/0000173 A1 | 1/2008 | Lenox et al. | |
| 2008/0053517 A1* | 3/2008 | Plaisted et al. | 136/251 |
| 2009/0000220 A1* | 1/2009 | Lenox | 52/173.1 |
| 2009/0025314 A1* | 1/2009 | Komamine et al. | 52/173.3 |
| 2009/0165843 A1* | 7/2009 | Horioka et al. | 136/251 |
| 2009/0229654 A1* | 9/2009 | Morita et al. | 136/251 |
| 2009/0293863 A1* | 12/2009 | Augenbraun et al. | 126/623 |
| 2009/0293864 A1* | 12/2009 | Augenbraun et al. | 126/623 |
| 2009/0293932 A1* | 12/2009 | Augenbraun et al. | 136/244 |
| 2010/0065108 A1* | 3/2010 | West et al. | 136/251 |
| 2010/0132693 A1* | 6/2010 | Schnitzer | 126/623 |
| 2010/0147362 A1* | 6/2010 | King et al. | 136/251 |
| 2010/0154784 A1* | 6/2010 | King et al. | 126/623 |
| 2010/0193012 A1* | 8/2010 | Klammer et al. | 136/251 |
| 2011/0000519 A1* | 1/2011 | West | 136/244 |
| 2011/0000520 A1* | 1/2011 | West | 136/244 |
| 2011/0126881 A1* | 6/2011 | Hong et al. | 136/244 |
| 2011/0214365 A1* | 9/2011 | Aftanas | 52/173.3 |
| 2011/0314752 A1* | 12/2011 | Meier | 52/173.3 |
| 2012/0024563 A1* | 2/2012 | Korman et al. | 174/51 |
| 2012/0060901 A1* | 3/2012 | Schnitzer | 136/251 |
| 2012/0079781 A1* | 4/2012 | Koller | 52/173.3 |
| 2012/0102853 A1* | 5/2012 | Rizzo | 52/173.3 |
| 2012/0234377 A1* | 9/2012 | Erickson | 136/251 |
| 2012/0255596 A1* | 10/2012 | Korman et al. | 136/251 |
| 2012/0298186 A1* | 11/2012 | West | 136/251 |
| 2012/0298188 A1* | 11/2012 | West et al. | 136/251 |
| 2013/0048815 A1* | 2/2013 | Wagner et al. | 248/228.1 |
| 2013/0104471 A1* | 5/2013 | Kobayashi | 52/173.3 |

OTHER PUBLICATIONS

Pitched roof structure for framed and frameless PV-modules; Pitched roof mounting system for framed and frameless PV-Moduleshttp; URL : //www.haticon.de/en/pitched-roof-mounting-system-framed-pv-modules; downloaded Feb. 25, 2010; 2 Pages.

* cited by examiner

PHOTOVOLTAIC FRAMED MODULE ARRAY MOUNT UTILIZING ASYMMETRIC RAIL

BACKGROUND

The subject matter disclosed herein relates generally to photovoltaic modules, and more specifically to mounting structures and methods applicable to framed photovoltaic module arrays.

Photovoltaic systems offer a clean and renewable source of energy. Critical factors in usage and adoption of photovoltaic cells as a supplementary or primary power source include cost to end users and ease of installation. In residential environments, photovoltaic modules are typically installed on house roofs or other suitable surfaces providing optimal exposure to sunlight during the day.

Installation of photovoltaic modules typically requires elaborate fitting equipment and installation procedures. A significant number of parts are required for a complete installation of a residential photovoltaic module array with one commercially available system including up to 700 different parts for installation of a two row array having twenty four framed modules. Manufacturing costs and installation costs increase significantly as the number of parts is increased. Such costs are a barrier to widespread usage and adoption of photovoltaic cells as power sources.

Accordingly, a need exists for systems and methods that will reduce the number of parts and the complexity of installation of photovoltaic modules.

BRIEF DESCRIPTION

According to an embodiment of the present invention, a photovoltaic framed module array apparatus for mounting a first framed photovoltaic (PV) module and a second framed PV module, comprises a first rail. The first rail includes an insert slot for accommodating an insert edge of the first framed PV module, and a capture slot for accommodating a capture edge of the second framed PV module. The capture slot is positioned substantively parallel to the insert slot.

According to another embodiment, a method for assembling a photovoltaic framed module array includes inserting an insert edge of a first framed photovoltaic (PV) module into an insert slot of a first rail, placing a capture edge of the first framed PV module into a capture slot of a second rail, and securing the first framed PV module to the second rail. The first framed PV module is rigidly secured between the first rail and the second rail.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
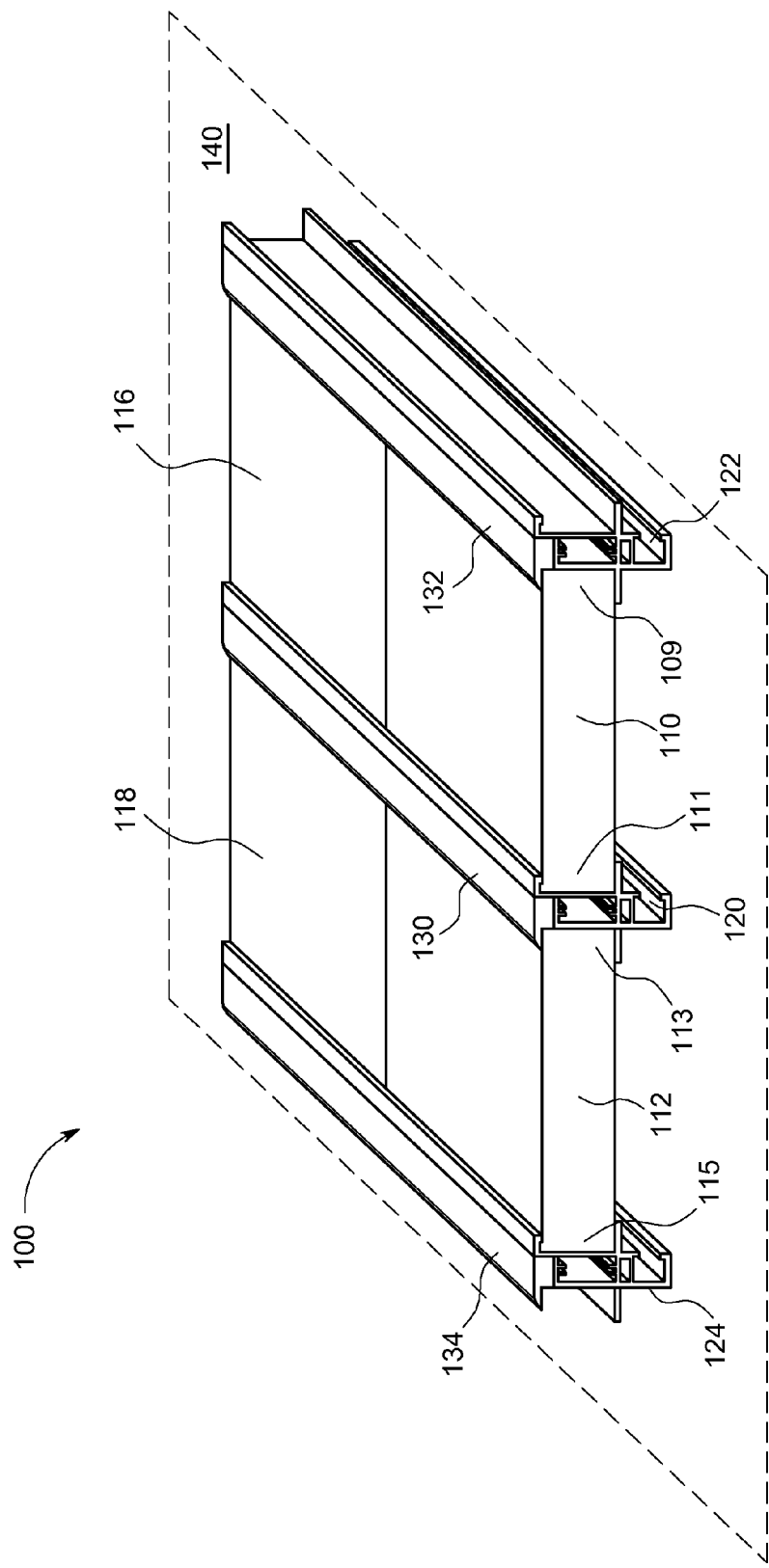
FIG. 1 is a perspective view of a framed module array according to an embodiment of the invention.

FIG. 1 illustrates a framed photovoltaic module array apparatus 100 according to an embodiment of the present invention. The framed photovoltaic module array apparatus 100 is mounted on a base support 140, such as a roof, ground, or any other rigid support. The framed photovoltaic module array apparatus 100 includes multiple framed photovoltaic modules (first) 110, (second) 112, (third) 116, (fourth) 118 installed using rails (first) 120, (second) 122, (third) 124 and clamps (first) 130, (second) 132, (third) 134 to form the framed photovoltaic module array apparatus 100. Each of the framed modules, for example 110, 112, have a capture edge 109, 113 and an insert edge 111, 115 respectively. As illustrated by FIG. 1, the first framed module 110 and the second framed module 112 are assembled on to either sides of the rail 120 and aligned in a parallel orientation, which is referred to as a "parallel and across the rail" configuration for the purpose of this discussion. The first framed module 110 is assembled sequentially or adjacently with the third framed module 116, on to the same side of the rail 120, which is referred to as an "adjacent and on the same side of the rail" configuration for the purpose of this discussion. Typically, the framed modules (e.g. 110, 112) have a rectangular cross section. In some embodiments, the framed modules are configured to accommodate various shapes of the edges of the framed modules.

Figure 2:
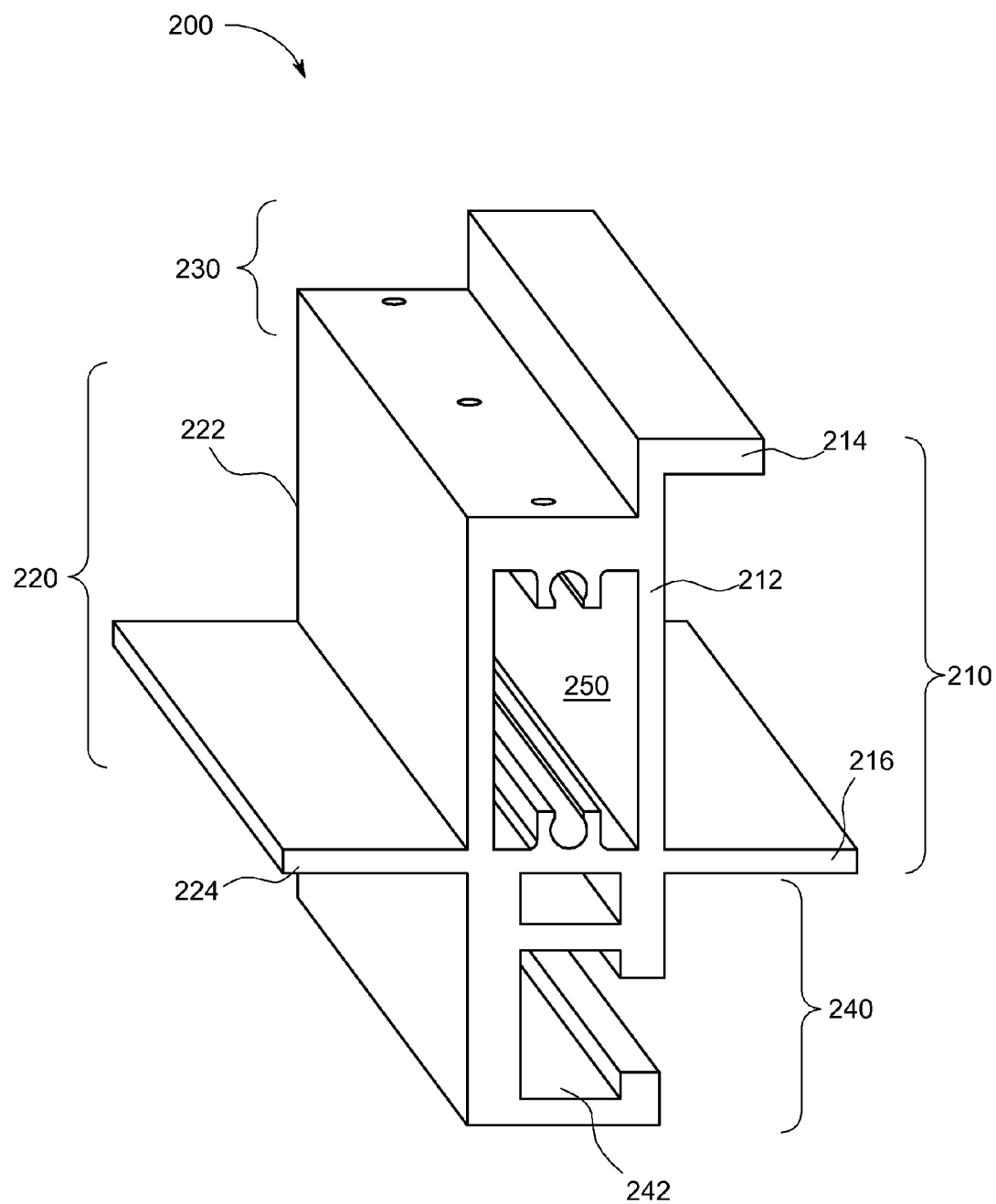
FIG. 2 is a perspective view of a section of a rail according to an embodiment of the invention.

FIG. 2 illustrates a section 200 of the rail 120 of FIG. 1 according to an embodiment of the invention. The rail 120 includes an insert slot 210, a capture slot 220, a clamp slot 230, a mounting interface 240, and a cavity 250. As illustrated by FIG. 2, the insert slot 210 and the capture slot 220 are positioned at opposite sides of the rail allowing disposition of multiple parallel rails to support multiple module rows therebetween. Therefore, the insert slot 210 and the capture slot 220 are positioned on opposing sides of the rail 120, and configured to accommodate different framed modules on the opposing sides such as, for example, the framed modules 110 and 112 respectively in FIG. 1. For example, this configuration allows three rails to support two full rows of modules. As illustrated, the cavity 250 separates the insert slot 210 and the capture slot 220. In alternate embodiments, the cavity 250 may be filled up, and hence there may not be a cavity. The cavity 250, if present, according to certain contemplated embodiments, provides a channel for photovoltaic system utilities, for example, wires, cables, drainage channels and the like. The clamp slot 230 is positioned above the cavity 250, and the mounting interface 240 extends below from the bottom of the cavity 250. As illustrated, the rail 120 has an asymmetrical shape to allow for insert and capture of framed photovoltaic modules. While one side of the rail 120 (insert slot 210) is configured to accommodate an edge a framed photovoltaic module by way of insertion, the opposite side of the rail 120 (capture slot 220) is configured to accommodate an opposite edge of another framed photovoltaic module and provide for clamping of the opposite edge, thereby capturing the edge. It is appreciated here that clamping provides mechanical restriction of the module within the capture slot of the rail, and the clamp may be affixed or padlocked to deter module theft. Further such mechanical restriction may be attained using any other well known mechanisms, and all such mechanisms are included within the scope and spirit of the present invention. It is noted here that the two sides of the rail 120 have a different shape and configuration to suit different purposes, and therefore and asymmetric configuration of the rail 120, advantageously provides for the insert and capture of framed PV modules. Those skilled in the art will appreciate that similar shapes embodying the general principles discussed herein may be devised, and all such obvious shape and form variations are included within the scope and spirit of the present invention.

The insert slot 210 accommodates an insert edge of a framed module, for example the insert edge 111 of the framed module 110. Accordingly, the insert slot 210 provides a rigid receptacle (or a channel) with a vertical boundary 212 bound within an upper boundary 214 and a lower boundary 216. In the illustrated embodiment, the insert slot 210 defines an angular "C" shape to match closely, the profile of the insert edge of the framed module (e.g. the framed module 110) having a similar angular "C" shape profile. In embodiments with the framed modules having insert edges of non-rectangular shape, the insert slot 210 may be sized to provide a receptacle shape to match the profile of the insert edges, in general, and provide a substantively close fit and ease in insertion of the insert edge of the framed modules into the insert slot 210.

Capture slot 220 accommodates a capture edge of a framed module that is different than the framed module captured by the insert slot 210 such as, for example the capture edge 115 of the second framed module 112 of FIG. 1. The capture slot 220 includes a vertical boundary 222, and a lower boundary 224 (e.g. a ledge) projecting normally out of the vertical boundary 222 at the bottom end of the vertical boundary 222. It is noted that, as illustrated by FIG. 2, the vertical boundary 222 of the capture slot 220 and the vertical boundary 212 of the insert slot 210 are aligned to be parallel, however, the lower boundary 224 of the capture slot 220 projects in an opposite direction to the upper and lower boundaries (214 and 216 respectively) of the insert slot 210. In one embodiment, the lower boundary 224 and the lower boundary 216 project out at substantively the same height within the rail 120, and, for ease of mounting, the vertical boundary 222 is shorter than the vertical boundary 212.

The clamp slot 230 provides accommodation for a clamp (for example the clamp 130 of FIG. 1) configured to clamp a capture edge of a framed module to the rail 120, for example the capture edge 115 of the second framed module 112. The clamp slot 230 is a substantively horizontal platform on to which the clamp 130 may be removably attached. While in the illustrated embodiments the clamp 130 is mechanically fastened on to the clamp slot 230, those skilled in the art will readily appreciate alternate attaching mechanisms for attaching or removably attaching the clamp 130 on to the clamp slot 230 may be used equivalently. The clamp slot 230 is positioned to be between the vertical boundary 212 and the vertical boundary 222. At least a portion of the vertical boundary 212 (the portion exceeding the height of the vertical boundary 222, for example) defines an edge of the clamp slot 230.

The mounting interface 240 provides a rigid interface for the rail 120 with a base support, for example similar to the base support 140 of FIG. 1. In the embodiment illustrated by FIG. 2, the mounting interface 240 includes a T-bolt slot 242.

Figure 3:
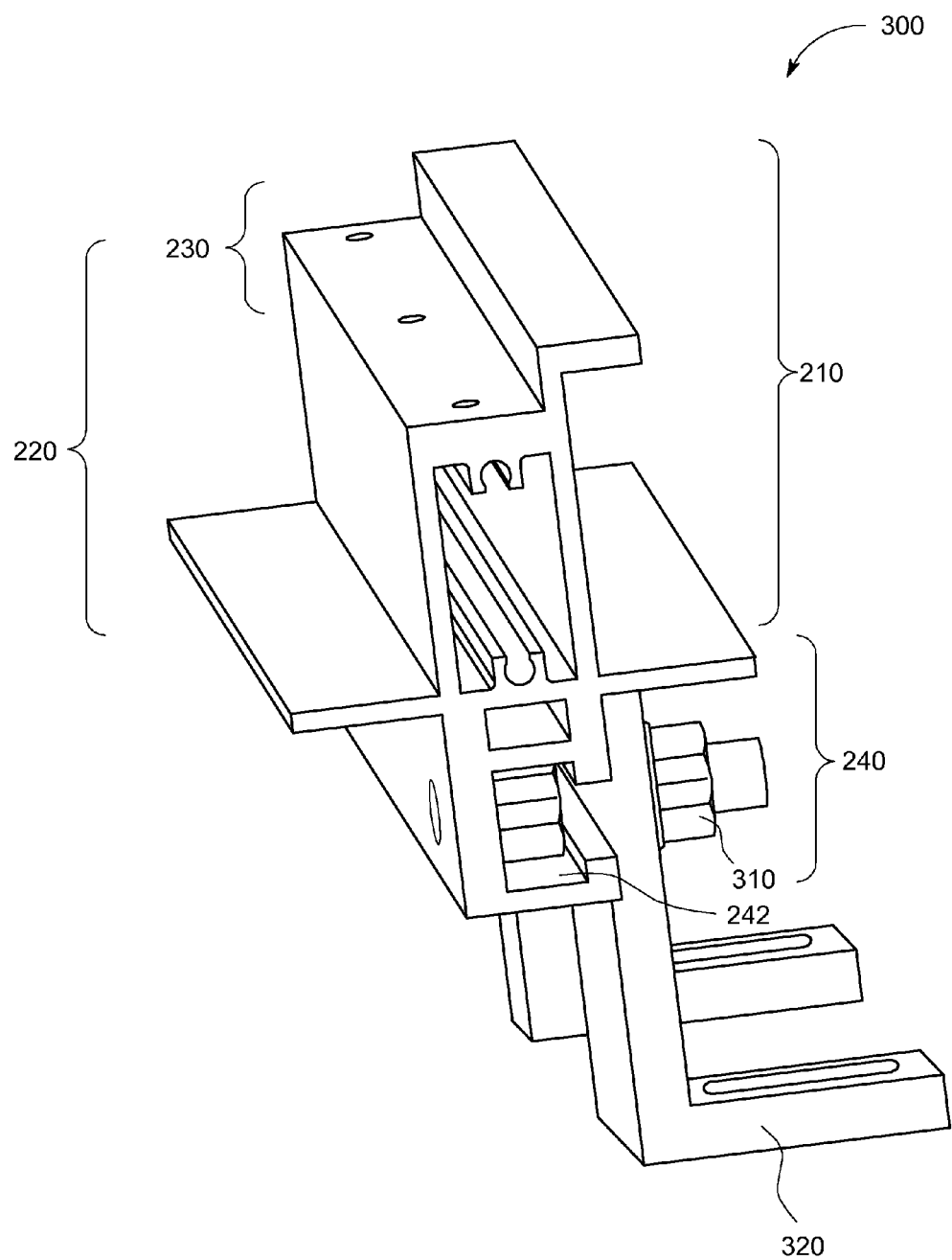
FIG. 3 is a perspective view of the rail of FIG. 2 with a mounting interface.

FIG. 3 illustrates a section 300 of the rail 120 in a bolted configuration with a mounting hardware. More specifically, a T-bolt 310 is inserted into the T-bolt slot 242 provided in the mounting interface. The T-bolt 310 bolts a bracket 320 to the rail 120 in a removably attached (rigid interface) configuration.

Figure 4:
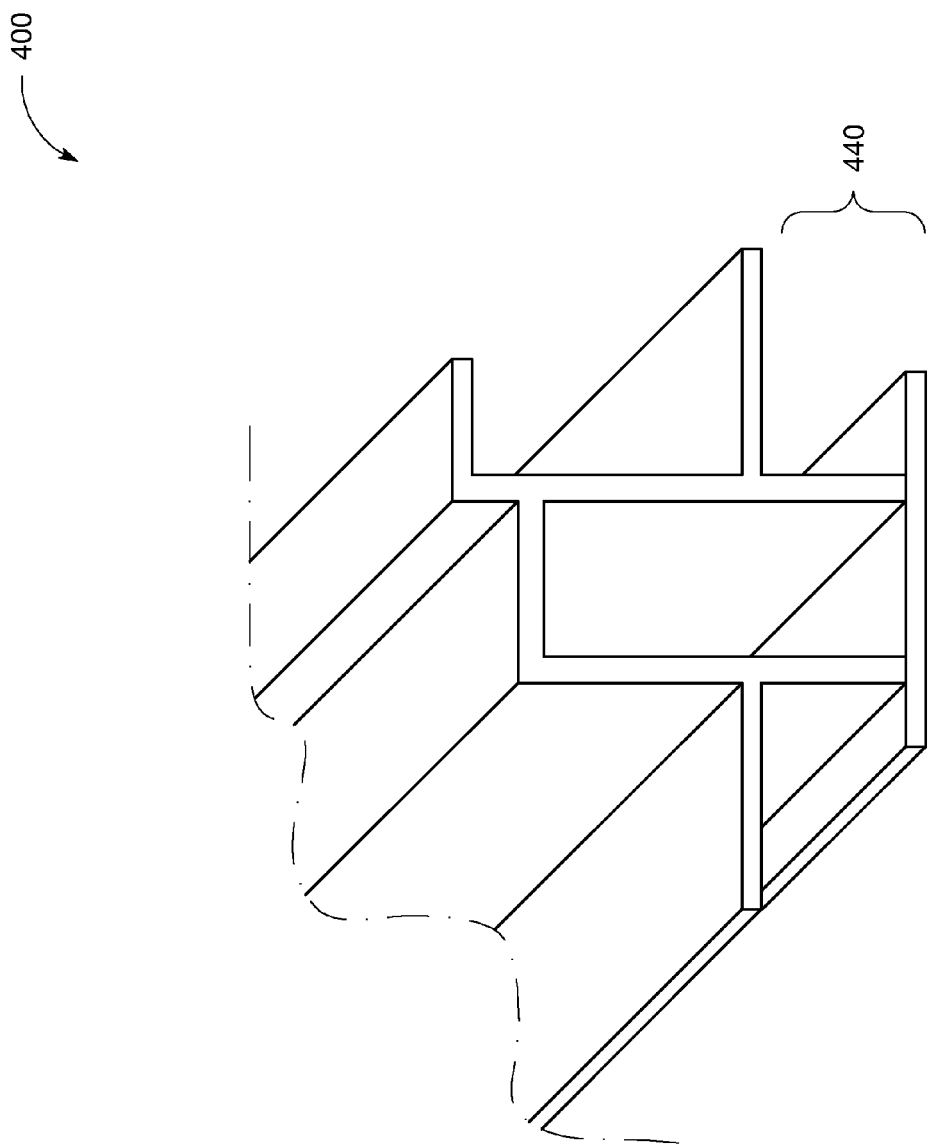
FIG. 4 is a perspective view of a section of a rail according to another embodiment of the invention.
Figure 5:
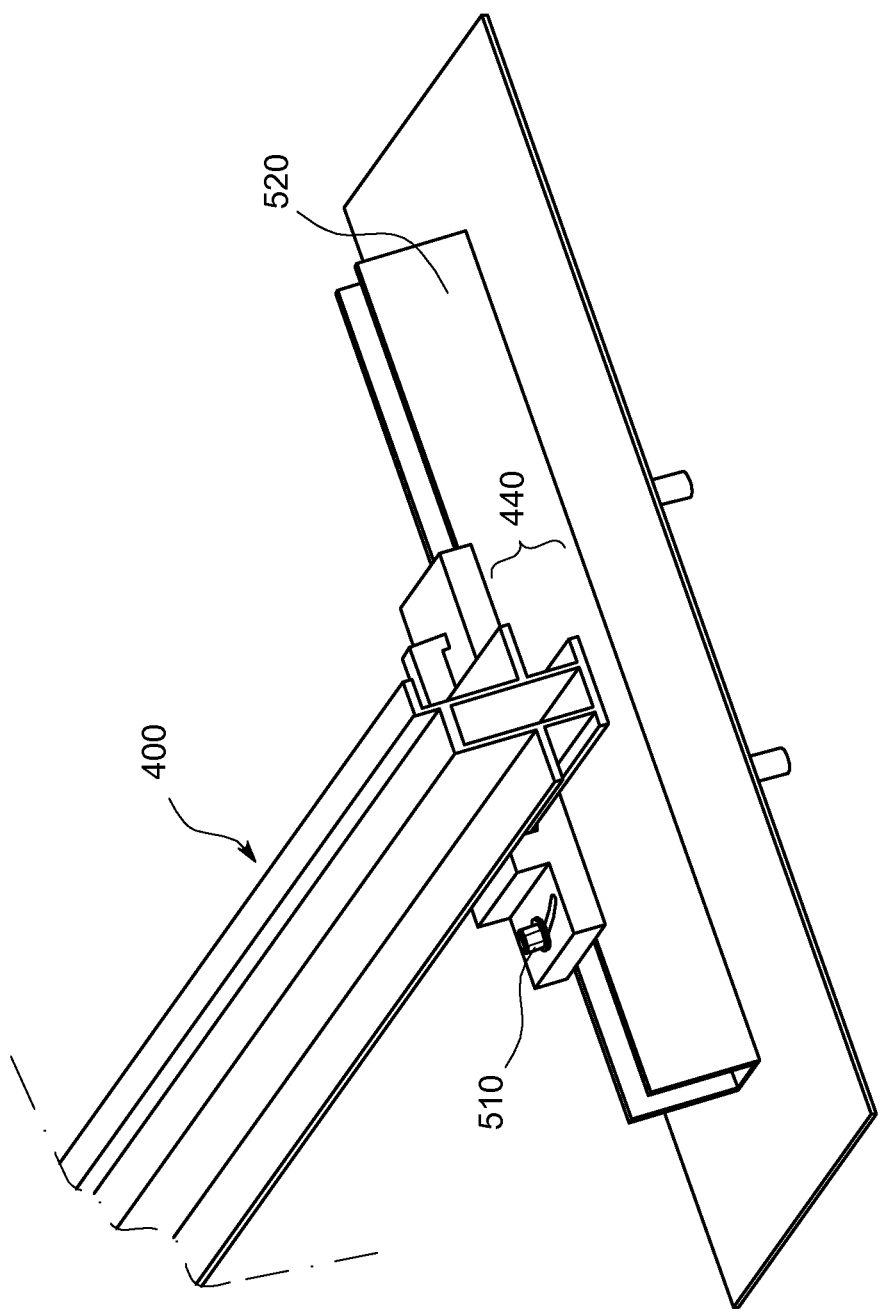
FIG. 5 is a perspective view of the rail of FIG. 4 with a mounting interface.

FIGS. 4 and 5 illustrate a rail 400 according to another embodiment of the present invention. The mounting interface 440 of the rail 400 provides a rigid interface for the rail 400 with a base support using a bolt (or another mechanical fastener) 510 and a roof attachment 520 (e.g a stanchion), such as those generally known in the art, and for example, the roof attachment illustrated by FIG. 5. Those skilled in the art will appreciate that the embodiments illustrated by FIGS. 4 and 5 provide alternative geometry to the base of the rail for mounting. Various similar mounting mechanisms will appear readily to those skilled in the art, and all such obvious variations are included within the scope and spirit of the present invention.

Figure 6:
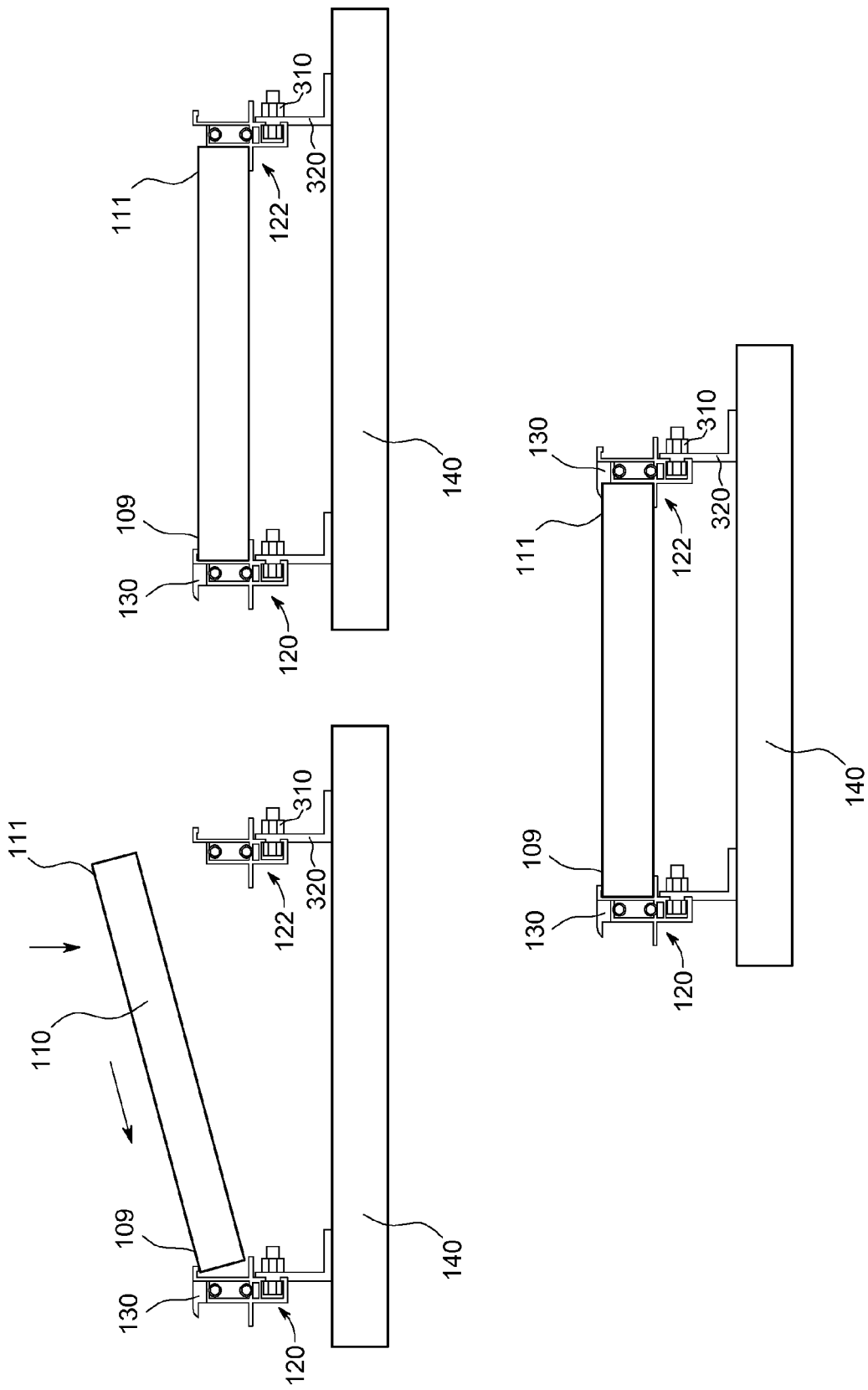
FIG. 6 is a front view of multiple steps involved in the insert and capture of a framed module for creating a framed module array, according to an embodiment of the present invention.

FIG. 6 illustrates a technique for installation of the photovoltaic framed module array apparatus 100. For the sake of simplicity, installation of the framed module 110 using the rails 120 and 122 is illustrated. The insert edge 109 of the framed module 110 is inserted in to the insert slot of the rail 120. The capture edge 111 of the framed module 110 is then allowed to come to rest on to the capture slot of the rail 122, while the insert edge 109 fits cleanly in to the insert slot of the rail 120. As noted earlier, the insert and capture slots within the various rails (120, 122, 124) are configured at substantively the same height within each rail, and the framed module 110 is held at a substantively similar height from the base of the first and second rails 120, 122. The capture edge 111 of the framed module 110 is then captured on to the rail 122 using a clamp 130. The clamp 130 is screwed onto the clamp slot of the rail 122, for example, as illustrated by the figures.

In the configuration illustrated by FIG. 6, the rails 120 and 122 are identical, however, in other configurations, for example, in which a rail is at an edge of the array 100, the rail at the edge may include only a subset of the features (e.g. only the capture slot, or only the insert slot, depending on the location within the photovoltaic framed module array apparatus 100) of the other rails, for example, the rail 120 of FIGS. 1 and 2.

Figure 7:
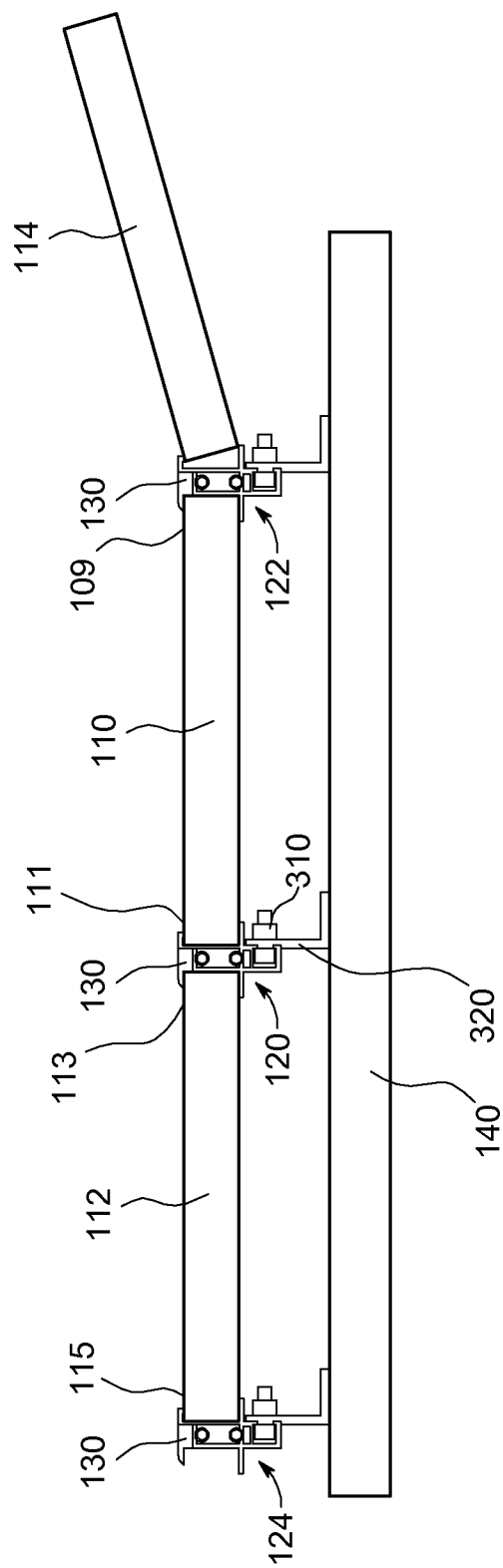
FIG. 7 is a front view of multiple framed modules assembled adjacently, according to an embodiment of the present invention.

Referring now to FIG. 7, installation of multiple framed modules (110, 112, 114) in a parallel and across the rail configuration is shown. The framed module 110 represents a row of framed modules installed along the rails 120 and 122, for example, framed modules 110 and 116 of FIG. 1, in an adjacent and on the same side of the rail configuration. Rows of framed modules (represented by the framed module 114) may be added similarly across each rail, for example, the rail 122, to scale the apparatus 100 as required. For example, a row of framed module represented by the framed module 112 is included between the rails 120 and 124. Further, according to an embodiment, the insert slots and the capture slots of the rails are configured to accommodate the first framed PV module 110 and the second framed PV module 112 at substantively the same level, so as to provide a substantially continuous surface across the rails (e.g. the rail 120 and/or the rail 124) within the apparatus 100. Each of the framed PV modules (110, 112, 114) illustrated in FIG. 7 represents a row of framed modules. Specifically, the framed PV module 110, mounted on the rails 120, 122 on either side, represents a row having multiple other PV framed modules mounted on the rails 120, 122, for example, behind the framed PV module 110. It is further appreciated here that the asymmetrical design as discussed with respect to the various embodiments, utilizes 2n−1 rails to support n rows of framed PV modules, where n is a natural number representing the number of rows of framed PV modules. However, it is appreciated that only for a single row of framed PV modules (n=1), the number of rails required is two (2), which does not follow the formula of 2n−1.

Various embodiments (or equivalents thereof) discussed herein provide several advantages. For example, the insert and capture functionality afforded by the photovoltaic framed module array apparatus 100 simplifies the installation procedure significantly, and reduces the need for a highly skilled laborer for installation, directly reducing the cost and the time required for installation. Furthermore, the modular nature of the photovoltaic framed module array apparatus 100 provides easy scalability for larger apparatus installations. The disclosed embodiments further utilize a lesser number of components, for example, in one embodiment, only about 400 parts are required for an array having two rows and twenty four photovoltaic framed modules, offering reduction in the number of parts by over 40 percent. The reduction in the number of parts provides a reduction in manufacturing costs and installation costs. Furthermore, the disclosed embodiments allow for an advantage in ease of repairability, since it is very easy to remove any module form the insert and capture slots, for example, in order to repair and/or replace the modules. It is appreciated here that the disclosed embodiments provide significant cost, complexity and time advantages in the installation of photovoltaic framed module arrays, thereby making the use of photovoltaic cells as sources of energy easier and more cost effective for the end user.

Figure 8:
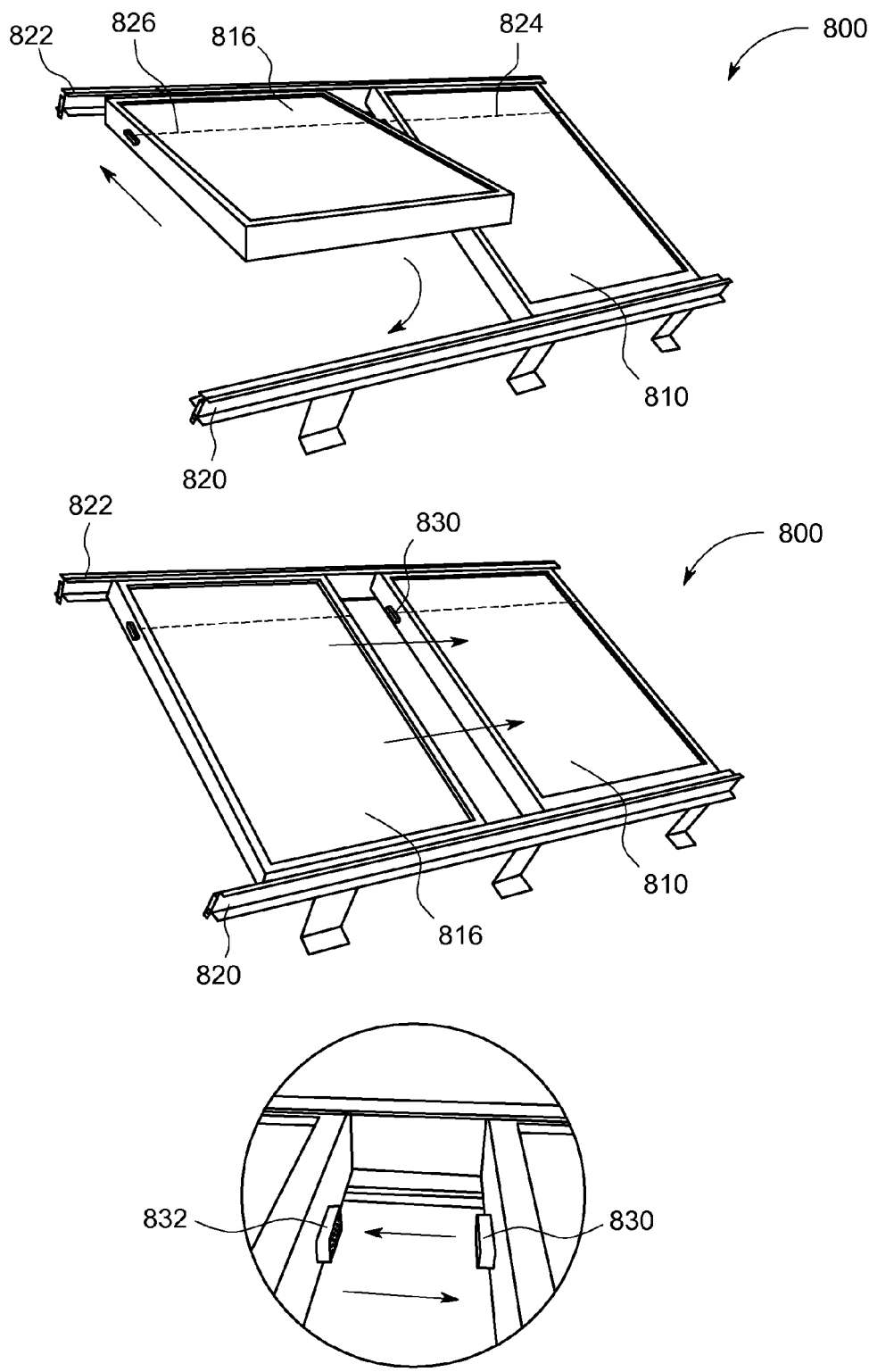
FIG. 8 is a framed module array comprising electric wire connections, according to another embodiment of the present invention
Figure 9:
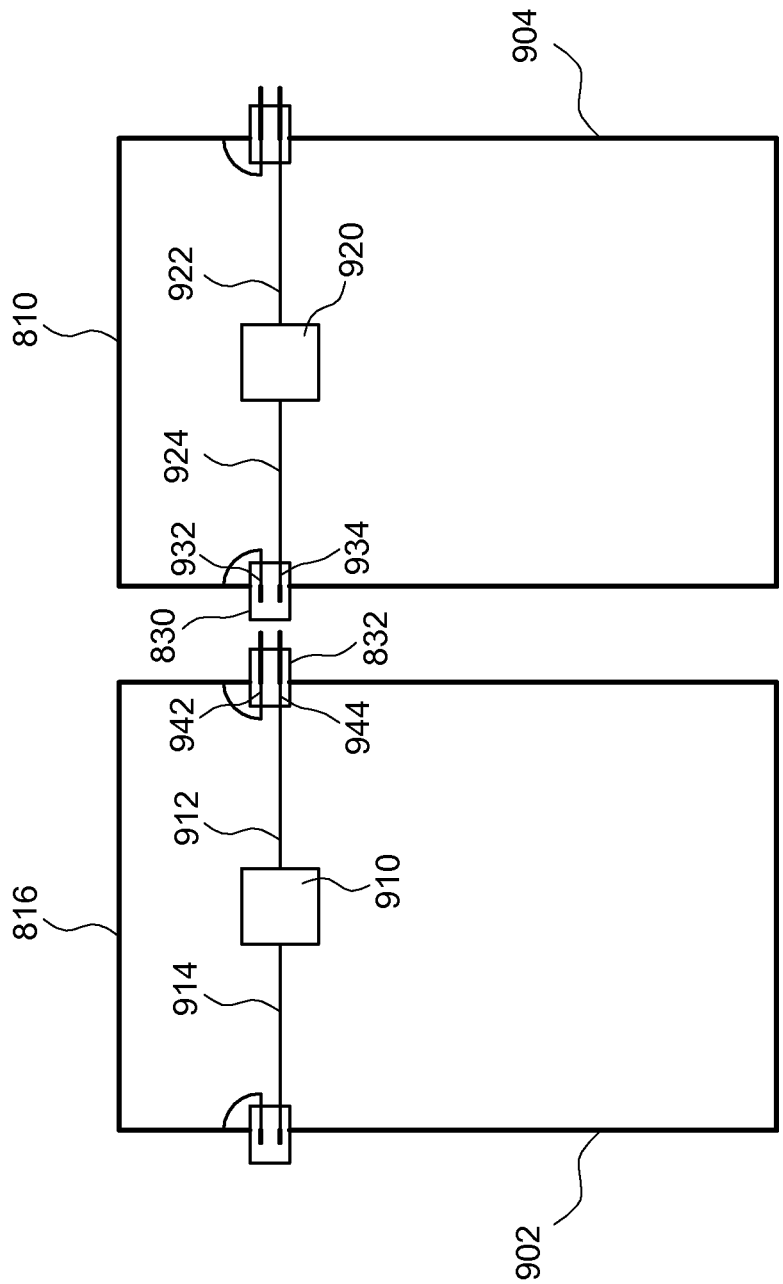
FIG. 9 is a schematic representation of the electrical wiring in the framed module array of FIG. 8.

FIGS. 8 and 9 illustrate a photovoltaic framed module array apparatus 800 including electrical fittings according another embodiment of the present invention. The photovoltaic module array apparatus 800 allows for plug and play of PV modules, and eliminates the need for substantive wiring at the time of installation of PV module systems or apparatus, as illustrated. With respect to FIG. 8, the apparatus 800 includes a first framed module 810 and a second framed module 816 in an adjacent and on the same side of the rail configuration, between a first rail 820 and a second rail 822. The framed modules 810, 816 each include a first electric wiring 824 and a second electric wiring 826, respectively, within the body of the respective framed modules 810, 816. The power generated by the apparatus 800 is communicable to a power storage source or to a power consumption device using the electric wiring. Each framed module 810, 816 further includes, respectively, a first electric connector jack 830 and a second electric connector jack 832. The first jack 830 and the second jack 832 is configured to couple electrically with a single insert operation, such as those generally known in the art. Several other such coupling configurations of the jack will occur to those skilled in the art, and are included within the scope and spirit of the present invention. As illustrated by FIG. 8, the first framed module 810 is already mounted on the rails 820 and 822, and the second framed module 816 is inserted into the rail 820 and captured on to the rail 822. Initially, the second framed module 816 is mounted onto the rails 820, 822 such that a gap exists between the first framed module 810 and the second framed module 816. As further illustrated in FIG. 8, the second framed module 816 is slid towards the first framed module 810 to mate with the first framed module 810. In the process, the first electric connector jack 830 of the first framed module 810 automatically mates (electrically couples) with the second electric connector jack 832 of the second framed module 816. The easy installation provide by the insert and capture feature of the apparatus 100 is leveraged by the apparatus 800 to further include electrical connectivity across framed modules using a single, simple operation, further reducing the complexity, number of different parts, number of operations required to install, and the time required to install the apparatus. Those skilled in the art will appreciate that the insert and capture techniques as discussed with respect to various embodiments discussed herein, forwards the opportunity to slide the modules for plug and play. Furthermore, the arrangement as discussed allows for removal of most, if not all, extraneous wiring.

FIG. 9 is a schematic illustration of electric wiring configuration within two adjacent photovoltaic modules of FIG. 8, the first framed module 810 and the second framed module 816, each having a frame 902 and 904 respectively. Each of the modules (810, 816) has a first junction box 910 and a second junction box 920, respectively, that provides the wiring external to the module, necessary for the electrical series connection of adjacent modules. As shown, two wires (912, 914) extend from the first junction box 910 in the first framed module 810, and two wires (922, 924) extend from the second junction box 920 in the second framed module 816. The full open circuit voltage potential of each module appears across these wires, e.g. between the wires 912 and 914, and between the wires 922 and 924. As shown for each module, the wires terminate into connector jacks 830 and 832, that are integrated into the framed modules frames (902, 904) respectively. The connector jacks 830 and 832 positioned on opposite but facing sides of each module are female and male configured connectors, respectively, and each connector (830, 832) has two connection pins each (932, 934 and 942, 944 respectively). As noted previously one pin of each connector is joined to the power wire from a junction box and the second pin is electrically connected to the frames of the modules 902 and 904 for providing the ground connections. In this way, when the modules slide together on the insert and capture rails as provided by the various embodiments, both the power and ground connections are made through the plug and play connector interface, without the need to physically attach wires. For example, according to an embodiment, grounding wire, which is conventionally installed separately during installation of the PV module systems, advantageously, does not need to be installed in accordance with the illustrated embodiment. The ground wire is, for example, incorporated in the wiring of the plug and play embodiment illustrated by FIGS. 8 and 9.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features. Unless defined otherwise, technical and scientific terms used herein have the same meaning as is commonly understood by one of skill in the art to which this invention belongs. The terms "first", "second", and the like, as used herein do not denote any order, quantity, or importance, but rather are used to distinguish one element from another. Also, the terms "front", "back", "bottom", and/or "top", unless otherwise noted, are merely used for convenience of description, and are not limited to any one position or spatial orientation. It is also appreciated that the format can be portrait or landscape as defined by which opposite edges form the insert and capture sides, the long or short sides of the module. The modifier "about" used in connection with a quantity is inclusive of the stated value and has the meaning dictated by the context (e.g., includes the degree of error associated with measurement of the particular quantity).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A photovoltaic framed module array apparatus, comprising:
    a first framed photovoltaic (PV) module;
    a second framed PV module; and
    a first rail, comprising:
        an insert slot for accommodating an insert edge of the first framed PV module, wherein the insert slot is configured in a "C" shape to receive the insert edge and to restrict movement of the insert edge in a vertically upwards direction and a vertically downwards direction; and
        a capture slot for accommodating a capture edge of the second framed PV module, the capture slot positioned substantively parallel to the insert slot, the capture slot comprises a horizontal projection out of the first rail to provide a resting platform for the capture edge, and wherein the capture slot is configured in a "]" shape to restrict movement of the capture edge in a vertically downwards direction and to allow the movement of the capture edge in a vertically upwards direction.

2. The apparatus of claim 1, wherein the first rail has an asymmetrical shape.

3. The apparatus of claim 1, further comprising a clamp slot for accommodating a clamp to secure the capture edge of the second framed PV module in the capture slot.

4. The apparatus of claim 2, wherein the clamp is configured to releasably secure the capture edge in the capture slot to restrict the movement of the capture edge in a vertically upwards direction.

5. The apparatus of claim 2, wherein the insert slot and the capture slot are configured to accommodate the first framed PV module and the second framed PV module to provide a substantially continuous surface within the apparatus.

6. The apparatus of claim 1, further comprising a mounting interface for providing a rigid interface with a base support.

7. The apparatus of claim 6, wherein the mounting interface comprises a bolt and a bracket.

8. The apparatus of claim 6, wherein the mounting interface comprises a base roof attachment and a bolt.

9. The apparatus of claim 1, further comprising a second framed PV module adjacent to the first framed PV module along the first rail, wherein
    the first framed PV module comprises a first electric wiring and a first electric jack, and
    the second framed PV module comprises a second electric wiring and a second electric jack,
    and wherein the first electric jack is configured to interface with the second electric jack to electrically couple the first electric wiring with the second electric wiring.

10. The apparatus of claim 9, wherein the first electric jack and the second electric jack are configured to be mechanically coupled by insertion of the second electric jack into the first electric jack.

11. The apparatus of claim 9, wherein the first electric wiring and the second electric wiring includes a ground wiring.

12. The apparatus of claim 11, wherein a photovoltaic module assembly incorporating the apparatus does not require an installation of a separate physical ground wire.

13. The apparatus of claim 1, further comprising a second rail comprising a capture slot for accommodating a capture edge of the first framed PV module.

14. The apparatus of claim 13, further comprising a third rail comprising an insert slot for accommodating an insert edge of the second framed PV module.

15. The apparatus of claim 14, wherein n number of PV modules are accommodated by 2n−1 rails, at least one of the 2n−1 rails being similar to the first rail, wherein n is a natural number greater than 1.

* * * * *